(12) United States Patent
Aoi et al.

(10) Patent No.: US 6,391,490 B1
(45) Date of Patent: May 21, 2002

(54) BATTERY AND BATTERY HOLDER

(75) Inventors: Takayuki Aoi, Hirakata; Takeshi Inui, Yao; Takayuki Tanahashi, Osaka; Toru Hitomi, Moriguchi; Ryuichiro Ebi, Neyagawa, all of (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/582,234

(22) PCT Filed: Dec. 2, 1999

(86) PCT No.: PCT/JP99/06793

§ 371 Date: Jul. 24, 2000

§ 102(e) Date: Jul. 24, 2000

(87) PCT Pub. No.: WO00/35035

PCT Pub. Date: Jun. 15, 2000

(30) Foreign Application Priority Data

| Dec. 4, 1998 | (JP) | 10-345094 |
| Jun. 25, 1999 | (JP) | 11-180447 |
| Aug. 3, 1999 | (JP) | 11-219705 |

(51) Int. Cl.[7] .................. H01M 2/30; H01M 2/02
(52) U.S. Cl. .............. 429/176; 429/177; 429/178; 429/179
(58) Field of Search ............... 429/176, 177, 429/178, 179

(56) References Cited

U.S. PATENT DOCUMENTS

| 5,443,924 A | 8/1995 | Spellman |
| 5,532,080 A | * 7/1996 | Mizoguchi et al. ..... 429/179 X |

FOREIGN PATENT DOCUMENTS

| CH | 480739 | 10/1969 |
| FR | 2073475 | 10/1971 |
| GB | 1135199 | 12/1968 |
| JP | 8-96793 | 4/1996 |

OTHER PUBLICATIONS

English Language Abstract of JP 8–96793, Apr. 1996.

* cited by examiner

*Primary Examiner*—John S. Maples
(74) *Attorney, Agent, or Firm*—Greenblum & Bernstein, P.L.C.

(57) ABSTRACT

A battery has one terminal on a sealing assembly fitted to one open end of the cell casing, and the other terminal on the exterior surface of the cell casing such as to extend along the entire circular circumferential surface of a predetermined width. The other end of the cell casing opposite from the terminal is electrically insulated by affixing nonconductive films thereto. Two heat-shrinkable nonconductive labels are wound around and bonded to the cell casing, so that the terminal is formed in a recessed, ring-like form between the heat-shrinkable nonconductive labels.

12 Claims, 8 Drawing Sheets

BATTERY AND BATTERY HOLDER

TECHNICAL FIELD

The present invention relates to a battery and a battery holder that can be used with a different type of battery having a different voltage as current sources for various electric devices while preventing troubles caused by misuse of battery wherein a wrong type of battery is used either alone or in combination or a battery is reversely oriented.

BACKGROUND ART

The battery that is most commonly used in recent years is generally of cylindrical shape as shown in FIG. 11. Most of such cylindrical batteries Ba1 are configured such that a projection formed on a sealing assembly (not shown) for sealing an open end of a cylindrical cell casing 1 at one end thereof in a lengthwise direction (axial direction) serves as a positive terminal 2 and a flat surface at the other end of the cell casing serves as a negative terminal 3. Cylindrical cell of such type is widespread and has found a variety of applications in various sizes of IEC standard AAA, AA, A, C, and D. Typically, manganese dry cell batteries and alkaline manganese dry cell batteries are available on the market and widely used in the form of such cylindrical cell Ba1 for various general purpose applications. All of these various dry cell batteries generate electricity of 1.5V, because of which they are manufactured with the same outer dimensions and in the same configuration of the cylindrical shape and sold, for the purpose of enjoying the advantage of interchangeability between different types of cylindrical cells.

Meanwhile, lithium batteries are known to have outstanding characteristics such as light weight, high voltage, high energy density, and long life, and have been mass-produced and widely used for specific purposes as current sources for liquid crystal digital watches, memory backup of electronic instruments, and automatic compact cameras. Since lithium has a poor potential of about −3V, a lithium battery has an output voltage of 3V that is twice as high as the output voltage of the above mentioned various dry cell batteries and other aqueous electrolyte cells such as nickel cadmium cells. Specifically, a lithium battery constructed with manganese dioxide or fluorinated graphite for the positive electrode is most widely known as a 3V output voltage cell and has found wide applications.

However, the lithium battery cannot be used interchangeably with aqueous electrolyte cells because of its 3V output voltage that is twice as high as that of the aqueous electrolyte cells. That is, if a 3V lithium battery as described above and a 1.5V dry cell battery are mistakenly inserted together in an electric device which requires a rated voltage of 3V and has a configuration which is intended for receiving two series-connected aqueous electrolyte cells, and if these batteries are connected in series, it will not only deteriorate the performance of the batteries but also cause a serious trouble such as damage to or impairment of the electric device. For that reason those batteries of which output voltage is 3V such as the lithium battery have been developed in sizes and forms that are different from those of the 1.5V aqueous electrolyte batteries in order to avoid misuse.

If, for a portable electric device that needs a power source of more than 3 volts, a lithium battery can be used interchangeably with an aqueous electrolyte cell such as a dry cell, it will be very convenient since the user can use a lithium battery when he/she has no dry cells in stock. There will be another advantage that the lithium battery, that has various excellent characteristics as listed above, can be used not only for specific purposes but for a wide range of applications. In addition, a considerable decrease achieved by mass-production is expected since the existing equipment and metal molds for manufacturing aqueous electrolyte cells can be utilized for the production of lithium cells having the same outer dimensions as those of the aqueous electrolyte cells for the purpose of interchangeable use. Similarly, a decrease in cost during the distribution on the market can also be expected. To achieve such objects, a lithium battery must be realized which has a configuration and a structure such that the trouble caused by misuse wherein a wrong type of battery is used either alone or in combination or a battery is reversely oriented is reliably prevented, while having the same outer dimensions as those of the different type of battery.

A cylindrical secondary battery having a configuration that is different from that of the general cylindrical cell Ba1 shown in FIG. 11 is known as described in Japanese Laid-Open Patent Application 8-96793. As shown in FIG. 12A, this cell 4 has a projection on a sealing assembly (not shown) for sealing one open end of a metallic cell casing 10 as the positive end terminal 7 while the other end surface is electrically insulated, and two opposite, spaced negative electrode side terminals 8, 9 on the exterior surface of the cell casing 10. This secondary cell 4 is intended for interchangeable use with a primary cell that generates the same voltage as the secondary cell 4 and not for interchangeable use with a different type of battery with a different output voltage.

One of the side terminals 8 of this secondary cell 4 is given for charging purpose while the other side terminal 9 is used for detection of whether or not it is a secondary cell and for discharge to a load. The other end of the cell casing opposite the positive terminal is electrically insulated so that the secondary cell 4 is prevented from being connected in series to a primary cell that is mistakenly inserted together with the secondary cell 4 in a battery compartment. Thereby, only when either one of primary cells or secondary cells 4 are inserted in an end-to-end configuration in the battery compartment of an electric device are the cells connected in series, by which even if a primary cell without the side terminals 8, 9 is inserted mistakenly, it is prevented from being charged, and also, even if primary cells and secondary cells having the same output voltage are mixedly inserted, overdischarge of a secondary cell is prevented.

Referring to FIG. 12B which shows a production process of the above secondary cell 4, an insulation plate 13 having a projection 12 for determining the orientation of the secondary cell 4 and an insulation plate 17 having an insertion hole 14 for passing the projected positive terminal 7 therethrough are respectively bonded to the bottom and the top of an unjacketed cell that is obtained by inserting an electrode assembly into the cell casing 10, filling an electrolyte, and sealing the open end with a sealing assembly 11. A shrink-and-tack label 18 having terminal apertures 19 is then wound around and bonded to the exterior surface of the unjacketed cell, whereby the two portions of the exterior surface of the cell casing 10 corresponding to the terminal apertures 19 are left exposed as the side terminals 8, 9. The secondary cell 4 is inserted in the battery compartment with the projection 12 or the elongated, projected end terminal 7 aligned with a mark provided on the device side. When the cell is mounted, the side terminals 8, 9 situated on both sides of a width direction of the projection 12 are properly located in position where they contact charging element and detection or load element of the device side. The end terminal 7 and the projection 12, both being of elongated shape, are provided in parallel arrangement with each other as shown in the top plan view of FIG. 12C and the bottom plan view of FIG. 12D.

The structure of the above second cell 4 is, however, not suitable for manufacture in a high-speeded production line and its practicability is low, since it is necessary to align the terminal apertures 19, 19 of the shrink-and-tack label 18 and the insertion hole 14 of the upper insulation plate 13 and the projection 12 of the lower insulation plate 17 with each other, and to position the insertion hole 14 of the insulation plate 17 and the end terminal 7 in relation to each other. Moreover, the projection 12 on the bottom of the secondary cell 4 necessitates the provision of a slot for receiving the projection 12 in the battery compartment of the electric device, wherefore it is difficult to use the cell 4 interchangeably with other types of cells of the same size. In addition, it is generally believed that a battery has its terminals on both ends, and the battery user may well try to remove the insulation plate 13 inadvertently or by mistake. Since no countermeasure for such risk is provided, it is possible that the insulation plate 13 is removed even though it is relatively thick with projection 12, and that the cell is mistakenly used without the insulation plate 13.

There are known other batteries that allow for current collection and charging from the side surface, such as a secondary cell having a charging terminal on its side and a pair of discharging terminals on both ends of the cell casing, and a nickel cadmium cell of AA size that can be charged and discharged from a portion on its side. None of these cells enables interchangeable use with a different type of battery having a different voltage while preventing troubles caused by misuse or reverse polarity, and has a construction suitable for mass-production.

An object of the present invention is to provide a battery having a construction which enables mass-production and interchangeable use of the battery with a different type of battery having a different voltage and which prevents various troubles that can be caused by misuse of battery.

Another object of the present invention is to provide a common battery holder for different types of batteries having different output voltages, which battery holder is provided with a construction for preventing reliably the trouble caused by misuse or reverse polarity of battery.

DISCLOSURE OF THE INVENTION

In order to accomplish the above objects, the present invention provides a battery comprising a first terminal provided at one end of a battery casing, and a second terminal on an exterior surface of the battery casing. The second terminal is an entire circular circumferential surface of a predetermined width of the battery casing. The other end of the battery casing opposite the first terminal is electrically insulated by affixing an electrically nonconductive film thereto. Two heat-shrinkable nonconductive labels are wound around and bonded on the exterior surface of the battery casing at a predetermined spacing corresponding to the width of the second terminal, so that the entire exterior surface of the battery casing except a portion of the second terminal is electrically insulated by the heat-shrinkable nonconductive labels, and that the second terminal is formed in a recessed, ring-like form between the two heat-shrinkable nonconductive labels.

Since the present invention battery has its negative terminal in a recessed, ring-like form by electrically insulating the exterior surface of the battery casing with the heat-shrinkable nonconductive labels except the circular circumferential surface of predetermined width on the outer wall of the battery, the battery can be inserted into a battery holder without specifically determining its orientation. Accordingly, the construction for determining the inserting direction of the battery provided to a conventional secondary battery such as an elongated end terminal or projection are not necessary. The present invention battery can be mass-produced in a high-speeded production line and is highly practicable, since the two heat-shrinkable nonconductive labels need not be positioned in relation to each other before being bonded to the battery casing. Moreover, with the negative terminal in a recessed, ring-like form on the outer cylindrical surface of the battery casing, the present invention battery can be clearly distinguished from a different type of battery that has the terminals on both ends, while it can be used interchangeably with the different type of battery.

In another aspect of the present invention, in place of the two heat-shrinkable nonconductive labels, a sheet of heat-shrinkable nonconductive label having a separable portion at a position corresponding to the second terminal is wound around and bonded to the exterior surface of the battery casing so that the entire exterior surface of the battery casing is electrically insulated by the heat-shrinkable nonconductive label, the second terminal being covered with the separable portion of the heat-shrinkable nonconductive label before use. The separable portion of the heat-shrinkable nonconductive label is removed for revealing the second terminal when the battery is to be used.

When the battery is used, the separable portion of the heat-shrinkable nonconductive label is removed so as to expose the negative terminal. Same effects of the present invention battery as described above can be thereby achieved. In addition, since the negative terminal is covered with the label before the battery is used, its storability is excellent because of low self discharge, and its maintenance is facilitated. Moreover, the battery before use is clearly distinguishable from a used battery owing to the separable portion covering the negative terminal. There is also the advantage that both terminals are prevented from being short-circuited accidentally by a long metallic object. Furthermore, a sheet of heat-shrinkable nonconductive label can be readily wound around and bonded to the battery casing with the similar method to the one used for producing existing dry cell batteries, and thereby the bonding process of the heat-shrinkable nonconductive label can be simplified.

The heat-shrinkable nonconductive label is preliminarily coated with a heat-sensitive adhesive on an inner side thereof.

It is desirable that the negative terminal be located away from the center in a longitudinal direction of the battery casing toward one side at a distance from one end of the battery casing.

Thereby, the negative terminal of the battery which is located on one side of the center in a longitudinal direction is not connected to the side contact of the battery holder when inserted reversely, and thus the cell reverse can be prevented.

It is preferable to coat the end of the battery casing opposite the positive terminal with an electrically nonconductive material, and further to cover the end with a plurality of electrically nonconductive films superposed upon one another on said electrically nonconductive coating.

The plurality of electrically nonconductive films will deter the battery user from trying to remove the electrically nonconductive film either inadvertently or by mistake. Should the end surface of the battery casing be exposed, the existence of the nonconductive coating will help the user notice that it is not a terminal. The end of the battery casing opposite the positive terminal is thus prevented from being used as a terminal by misunderstanding.

The end of the battery casing opposite the positive terminal may be covered with a first nonconductive film of a size smaller than the end surface of the battery casing, and a second nonconductive film of a size smaller than the first nonconductive film bonded upon the first nonconductive film, said first and second nonconductive films being bonded to the end surface of the battery casing with a heat-sensitive adhesive that exhibits adhesion when heated.

In this way, two electrically nonconductive films can be smoothly superposed and bonded on one another, whereby the bonding process of multi-layer insulation structure of the electrically nonconductive films can be facilitated, and high quality batteries can be produced at low cost. The resistance to peeling of the first nonconductive film that is larger than the second nonconductive film is especially enhanced because the edge of the heat-shrinkable nonconductive label is overlapped from outside and shrunk into close contact with the periphery of the first nonconductive film, thereby preventing the edge thereof from peeling off.

The heat-shrinkable nonconductive label may have a width such that when it is wound around the exterior surface of the battery casing, one edge thereof extends a predetermined length from the ends of the battery casing, said edge of the heat-shrinkable nonconductive label being shrunk into close contact with the periphery of the ends of the battery casing.

Thereby, the edge of the heat-shrinkable nonconductive label is shrunk and fit onto the periphery of the electrically nonconductive film on the end surface of the battery casing. The resistance to peeling of the electrically nonconductive film is remarkably enhanced. The label of the present invention battery thus has an improved resistance to peeling when abraded with a foreign matter upon unexpected vibration, shock, or friction during the distribution of the battery.

The heat-shrinkable nonconductive label and the electrically nonconductive film should preferably be both opaquely colored, while the first and second terminals should have a metallic shine of nickel-plating.

The battery user who believes that a battery has its terminals on both ends can readily notice that one end surface of the present invention battery is not a terminal by the colored electrically nonconductive film, and will hardly try to remove the nonconductive film, whereby misuse of the battery can be prevented.

It is possible to construct the battery of the present invention such that both of the end surfaces of the battery casing are formed flat.

The battery casing can be elongated by the length corresponding to the projection on the sealing assembly that usually forms the positive terminal, and the battery volume is increased accordingly. The battery capacity can be thus augmented by increasing the electrode plate area of the electrode assembly in the battery.

In the battery with the heat-shrinkable label with the separable portion, the separable portion should preferably comprise rows of perforations formed along slits on both side thereof.

The separable portion of the label can thereby be easily removed so as to expose the negative terminal, without causing a portion of the label in the vicinity of the negative terminal to peel off.

The heat-shrinkable nonconductive label should preferably be coated with a heat-sensitive adhesive on an inner surface thereof except the separable portion.

The separable portion can thereby be readily removed when the battery is to be used.

The battery of the present invention may be applied to a cylindrical lithium primary cell which is configured in cylindrical form of the same outer dimensions as those of a cylindrical aqueous electrolyte battery, and is constructed with lithium for the negative electrode, and which has an output voltage higher than that of the aqueous electrolyte battery.

Thereby, the same battery casing used for the cylindrical aqueous electrolyte battery can be used for the present invention battery, and also, the equipment and metal molds for the production of existing cylindrical aqueous electrolyte batteries can be utilized, whereby high quality lithium primary batteries can be produced at a remarkably reduced cost. In addition, since the lithium primary battery according to the present invention has the same outer dimensions as those of the existing aqueous electrolyte battery, a common battery holder for the existing aqueous electrolyte battery can be used, while it is clearly distinguishable from the aqueous electrolyte battery, because of the negative terminal provided on the side surface of the battery casing and because of the end surface opposite the positive terminal being electrically insulated and having no function as a terminal, for which it cannot be used in a general electric device having a contact configuration for aqueous electrolyte batteries that have the terminals on both ends thereof. Accordingly, the lithium battery having outstanding characteristics such as light weight, high voltage, high energy density, and long life can be used not only for limited, specific purposes but for a wide range of applications, and can be used interchangeably with the aqueous electrolyte batteries.

The present invention further provides a battery holder comprising a first cavity for accommodating a first battery that has a first terminal on one end in a lengthwise direction and a second terminal on a side portion thereof, and has an output voltage of E volts, and a second cavity for accommodating a second battery that has a first terminal on one end in a longitudinal direction and a second terminal on the other end thereof, and has an output voltage of E/2 volts. The first cavity is provided with a positive contact and a negative contact at both ends thereof for contacting the first and second terminals of the second battery, and provided with a side contact on a side portion for contacting the second terminal of the first battery. The second cavity is provided with a positive contact and a negative contact at both ends thereof for contacting the first and second terminals of the second battery. The negative contact of the first cavity and the positive contact of the second cavity is connected with each other through a connector. The side contact of the first cavity and the negative contact of the second cavity is connected to and lead out as one common load terminal. The positive contact of the first cavity is lead out as the other load terminal.

The battery holder according to the present invention allows a voltage of E volts that is either the output voltage of the first battery or the sum of the output voltages of two series-connected second batteries to be supplied to the load terminals, only when the first battery is inserted in the first cavity in correct orientation, or when the two second batteries are respectively inserted in the first and second cavities in correct orientation. If, for example, the first battery is mistakenly inserted in the second cavity, it is not connected to another battery in the first cavity since the first battery has one terminal at only one end thereof, whereby it is prevented that an overvoltage is applied to the load terminals.

It is preferable that the side contact of the first cavity be situated away from the center in a longitudinal direction toward one side.

In this way, if the first battery is inserted in the first cavity reversely by mistake, the side terminal of the battery is not connected to the side contact of the first cavity, whereby cell reverse of the first battery can be prevented.

Other objects and characteristics of the present invention will become evident in the detailed descriptions and drawings given below. The characteristic features of the present invention can be used, where possible, alone, or in various multiple combinations.

BEST MODE FOR CARRYING OUT THE INVENTION

Figure 1A:
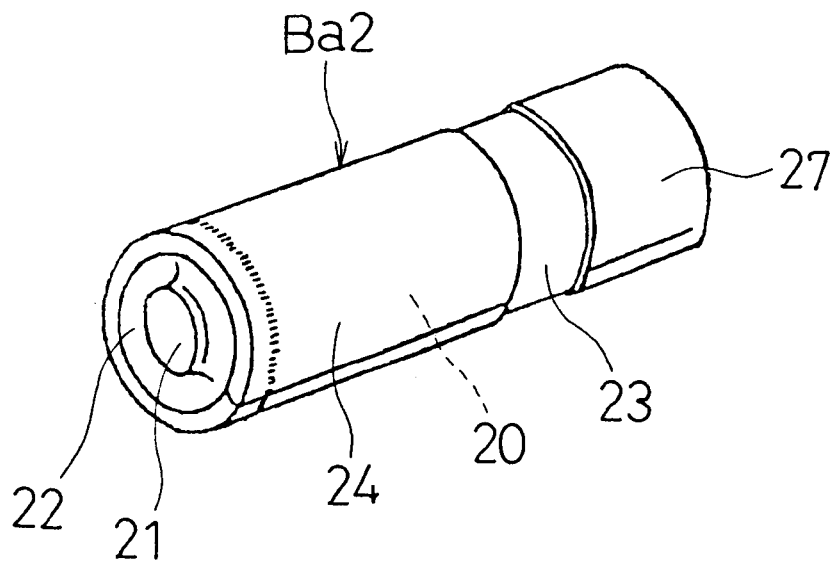
FIG. 1A and FIG. 1B are perspective views showing a cell according to a first embodiment of the present invention viewed from the positive terminal side and from the opposite side.
Figure 1B:
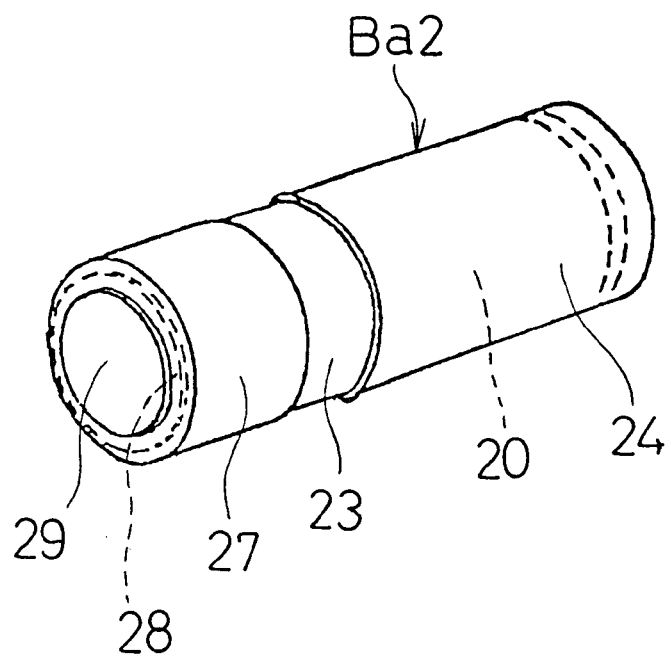

Preferred embodiments of the present invention will be hereinafter described with reference to the drawings. FIGS. 1A and 1B are perspective views illustrating a cell Ba2 according to a first embodiment of the present invention viewed from the side of a positive terminal 21 and from the opposite side. In this embodiment, as exemplified in the drawings, the cell Ba2 is a cylindrical lithium primary cell having a 3V output voltage twice as high as an existing dry cell battery or an aqueous electrolyte cylindrical cell Ba1 shown in FIG. 11 and having the same outer dimensions as those of the dry cell battery. The present invention cell can be used interchangeably with the cylindrical aqueous electrolyte cell without causing any trouble. The cylindrical lithium primary cell according to this embodiment will be hereinafter referred to as a high potential cell Ba2 in the following description for differentiating it from the existing cylindrical aqueous electrolyte cell shown in FIG. 11 which will be referred to as a low potential cell Ba1.

The high potential cell Ba2 has a projection serving as the positive terminal 21 on a sealing assembly 22 similarly to the low potential cell Ba1, and is provided with a negative terminal 23 that extends a whole circular peripheral surface of a predetermined width on the exterior surface of a cell casing 20 at a position situated away from the center of the casing in the axial direction to a side apart from the positive terminal 21 and spaced from the opposite end of the casing. The entire outer surface of the cell casing 20 except the positive terminal 21 and the negative terminal 23 is covered with an electrically nonconductive material that comprises two heat-shrinkable nonconductive labels 24, 27 for covering the exterior surface of the cell casing 20 and two electrically nonconductive films 28, 29 for covering the end face on the opposite side of the cell casing 20 from the positive terminal 21. The affixing of these heat-shrinkable nonconductive labels 24, 27 and electrically nonconductive films 28, 29 to the cell casing will be described later in detail.

Figure 2:
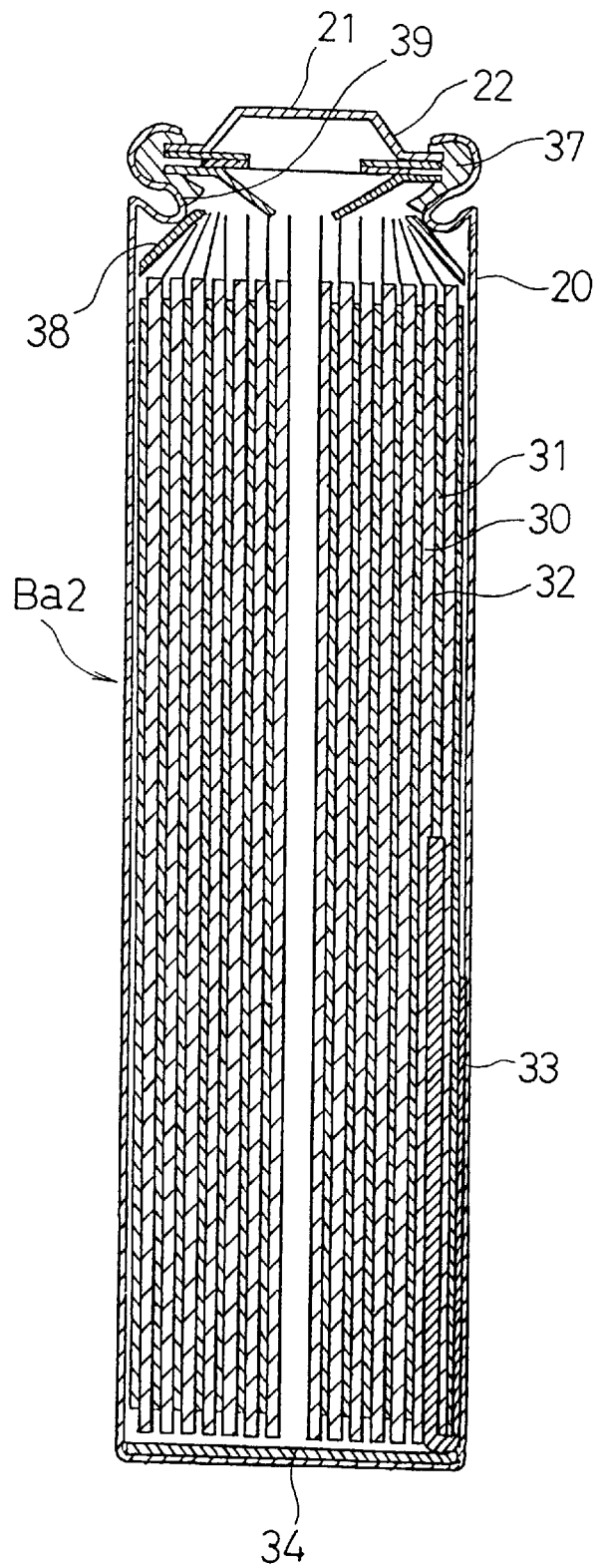
FIG. 2 is a longitudinal cross section of the above cell in a production process before an electrically nonconductive material is affixed thereto.

The high potential cell Ba2 is fabricated as described below. FIG. 2 shows in a longitudinal cross section an unjacketed high potential cell Ba2 in a fabrication process before the affixing of the heat-shrinkable nonconductive labels 24, 27 and the electrically nonconductive films 28, 29. The high potential cell Ba2 is a cylindrical lithium primary cell as mentioned above and thus is constructed with a strip of positive electrode plate 30 obtained by filling a collector metal core with an active material mixture consisting mainly of manganese dioxide and a strip of negative electrode plate 31 made of lithium metal, these positive and negative electrode plates 30, 31 being wound around in spiral fashion with a separator 32 interposed therebetween thereby constituting an electrode assembly. The electrode assembly is housed in the cell casing 20 with a negative electrode lead plate 33 folded and inserted to the outermost round of the electrode assembly such as to contact the inner circumference of the cell casing 20 thereby achieving electrical connection. The lower end of the electrode assembly is electrically insulated from the inner bottom surface of the cell casing 20 that serves as the negative terminal by a lower insulation plate 34 that has been inserted to the bottom of the cell casing, and the upper end of the electrode assembly is electrically insulated from the inner circumferential surface of the cell casing 20 by an upper insulation plate 38.

An organic electrolyte (not shown) is then poured in the cell casing 20, the organic electrolyte being obtained by dissolving lithium trifluorosulfonate in a mixed solvent of propylene carbonate and 1,2-dimethoxy ethane. The open end of the cell casing 20 is closed with the sealing assembly 22 having a safety vent placed on a support 39 of the cell casing 20 with a packing 37 inserted therebetween, after which the open end edge of the cell casing 20 is bent inwardly and crimped for tightly closing the cell casing, whereby the unjacketed high potential cell Ba2 is completed. An unjacketed cylindrical manganese dioxide lithium primary cell of, for example, 14.5 mm outer diameter, 50 mm height, and 1300 mAh battery capacity is thus obtained, which has the same outer dimensions as those of the existing cylindrical aqueous electrolyte cell Ba1.

Figure 3:
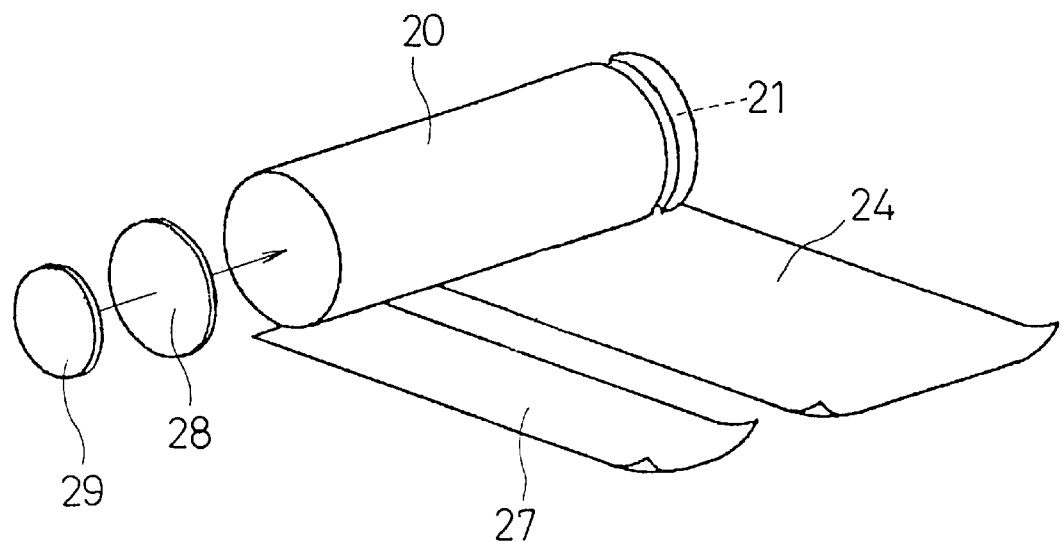
FIG. 3 is a perspective view showing a production process for affixing an electrically nonconductive material on the unjacketed cell of FIG. 2.

FIG. 3 is a perspective view showing how the electrically nonconductive material is affixed to the unjacketed cell of FIG. 2. A nonconductive film is preliminarily formed on the end surface of the cell casing 20 on the opposite side from the positive terminal 21, or alternatively, on the entire surface of the cell casing except the portions of the positive terminal 21 and the negative terminal 23, by applying and drying an electrically nonconductive coating or resin film, or by providing an electrically nonconductive enamel coating. Accordingly, at least the nickel-plated portions that serve as the positive terminal 21 and negative terminal 23 are left with a metallic shine.

Thus the entire outer surface of the cell casing 20 is covered with the electrically nonconductive material except the end surface on the side of the positive terminal 21 and the circular peripheral portion or the negative terminal 23 on the exterior surface of the cell casing 20. On the end surface of the cell casing 20 opposite the positive terminal 21 is affixed a relatively thin, electrically nonconductive inner film 28 of about 30 μm thickness and of the size slightly smaller than the cross sectional area of the end surface of the cell casing 20 in a direction orthogonal to the axis of the cell. Furthermore, a relatively thicker, electrically nonconductive outer film 29 of about 60 μm thickness and of the size slightly smaller than the inner film 28 is superposed and affixed on the inner film 28. The outer film 29 has substantially the same thickness as that of the aforementioned heat-shrinkable nonconductive labels 24, 27.

The electrically nonconductive films 28, 29 are preliminarily provided on one of their respective surfaces with a heat-sensitive adhesive that exhibits adhesion when heated to about 90° C. The bonding step of these films 28, 29 can be thereby simplified, and high quality lithium primary cells can be produced at low cost. The other side (outer side) of the nonconductive films 28, 29 is painted with the same color as that of the heat-shrinkable nonconductive labels 24, 27, while both terminal portions 21, 23 left as nickel-plated are exposed with a metallic shine as mentioned above. The battery user will thereby recognize more easily that the end surface of the cell casing on the opposite side from the positive terminal is not the other terminal, and it is quite unlikely that the user tries to remove these nonconductive films 28, 29.

Next, the two heat-shrinkable nonconductive labels 24, 27 are contacted at one end respectively to the exterior surface of the cell casing 20 at a spacing of about 5 mm that is the width of the circular peripheral portion designed as the negative terminal 23, and are wound around the cell casing 20 in an atmosphere of about 90° C., whereby the heat-sensitive adhesive that has been applied to the affixing surface in advance exhibits adhesion by the heat and bonds the labels on the outer cylindrical surface of the cell casing 20. The heat-sensitive film that forms the label body of the heat-shrinkable nonconductive labels 24, 27 is not subject to dimensional changes at the temperature of about 90° C. Therefore, the labels 24, 27 can be smoothly wound around and bonded to the exterior surface of the cell casing 20. The heat-shrinkable nonconductive labels 24, 27 have different widths but the same length which is set longer by several millimeters than the circumference of the cylindrical cell casing 20. Thus the labels 24, 27 are wound around with their respective ends overlapping the other ends by several millimeters so that they do not easily come off at the joint.

Figure 4:
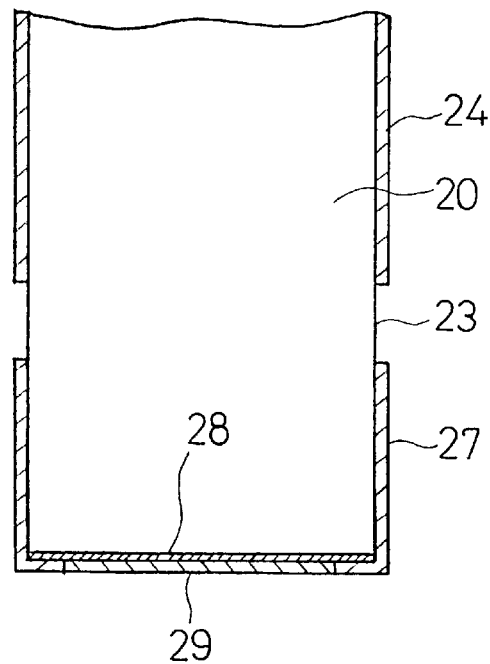
FIG. 4 is a cross section of a part of the above cell.

The widths of the two heat-shrinkable nonconductive labels 24, 27 are designed respectively such that they extend a fixed length from both ends of the cell casing 20 when they are set at a predetermined spacing as shown in FIG. 3. Accordingly, when they are wound around and bonded to the cell casing 20, the edges of the labels 24, 27 protrude outwardly from both ends of the cell casing 20. After being wound around the cell casing 20, the heat-shrinkable nonconductive labels 24, 27 are heated to a high temperature of about 180° C., whereby the heat-sensitive film constituting the label body shrinks by the heat, and the labels stick tightly to the exterior surface of the cell casing 20. The outwardly extended portions of the labels also shrink and adheres tightly to the perimeter of the end faces of the cell casing 20. The edge of one heat-shrinkable nonconductive label 27 outwardly extending from one end of the cell casing 20 superposes the perimeter of the inner nonconductive film 28 in close contact therewith and becomes coplanar with the outer nonconductive film 29 as shown in the partial cross section of FIG. 4.

Figures 12A, 12B:
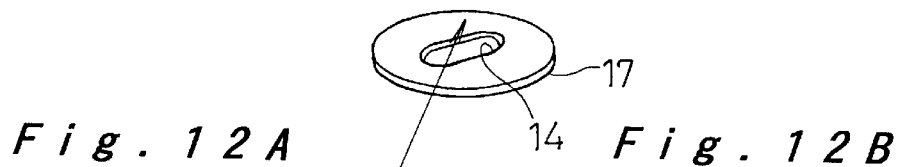
FIG. 12A is a front view.
FIG. 12B is an exploded perspective view.

The high potential cell Ba2 shown in FIG. 1A is completed through the production steps described above. The entire surface of the circular circumferential portion of a predetermined width on the cylindrical surface of the cell casing 20 is designed to form the negative terminal 23 in a recessed ring shape with the other surfaces of the cell casing electrically insulated by the heat-shrinkable nonconductive labels 24, 27. This allows the high potential cell Ba2 to be inserted in a battery compartment without determining the direction of insertion, and therefore, it is not necessary to provide a configuration for determining the mounting direction on both ends of the cell casing 20 such as the terminal 7 in a prolonged shape or the projection 12 provided to the conventional secondary battery 4 shown in FIG. 12A. Accordingly, two electrically nonconductive films 28, 29 and two heat-shrinkable nonconductive labels 24, 27 need not be positioned in relation to each other when bonding, wherefore the high potential cell Ba2 can be mass-produced in volume in a high-speed production line and is readily practicable.

Moreover, the inner nonconductive film 28 hardly comes off since it is overlapped at its perimeter by the heat-shrunk edge portion of the nonconductive label 27, its resistance to peeling being thereby remarkably enhanced. On the other hand the outer nonconductive film 29 and the edge of the heat-shrinkable nonconductive label 27 abut each other on the same plane, which also remarkably enhances the resistance to peeling when abraded with a foreign matter upon unexpected vibration, shock, or friction during the distribution of battery. Furthermore, even if the battery user tries to remove the nonconductive films 28, 29 inadvertently or by some mistake, the exposure of the end face of the cell casing 20 is reliably prevented by the multi-layer insulation structure wherein the inner nonconductive film 28 is protected at its perimeter by the nonconductive label 27 and the outer nonconductive film 29 is coplanar with the nonconductive label 27. It is accordingly prevented that the battery is used in a wrong mode wherein both end faces of the cell casing 20 are used as the electrode terminals.

Figure 11:
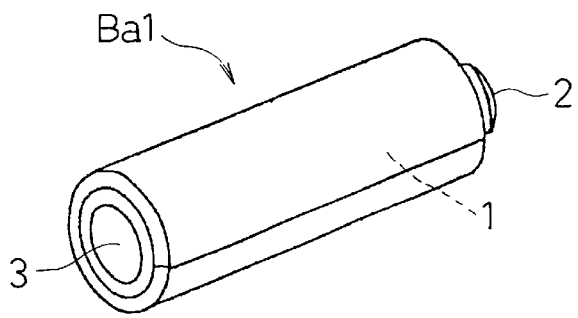
FIG. 11 is a perspective view showing an existing aqueous electrolyte low potential cell.

The high potential cell Ba2 in this embodiment is a cylindrical lithium primary cell having the same outer dimensions as those of the existing aqueous electrolyte cell or low potential cell Ba1 shown in FIG. 11, while it has twice higher output voltage of 3V as compared to the 1.5V lower potential cell Ba1. Cylindrical battery is currently the most popular, mass-produced battery and its manufacture technology has reached the most advanced level as compared to batteries of other shapes.

Accordingly, the cell casing used for the manufacture of aqueous electrolyte cylindrical cell Ba1 such as alkaline manganese dry cell batteries and alkaline storage batteries can be used for the high potential cell Ba2 of this embodiment. In addition, the equipment and metal molds for the production of the existing cylindrical cell Ba1 can also be utilized, whereby high quality cells can be produced at remarkably reduced cost.

Furthermore, since the high potential cell Ba2 has its negative terminal 23 on the exterior surface and its end face opposite from the positive terminal 21 is electrically insulated and has no function as an electrode terminal, the high potential cell Ba2 can be clearly distinguished from the conventional low potential cell Ba1, and because it cannot be used in an electric device having a terminal configuration fitted for low potential cells Ba1 as current source, the high potential cell Ba2 is reliably prevented from being used with the low potential cell Ba1. Moreover, misuse of cells by reverse connection is prevented since the negative terminal 23 is provided away from the center in the longitudinal direction to one side of the cell casing. The present invention thus enables a lithium battery that has outstanding characteristics such as light weight, high voltage, high energy density, and long life to come into the market not only for limited types of electric devices but for a wide range of general purpose applications, and to be used interchangeably with the low potential cell Ba1 as power sources for various electric appliances.

Figure 5:
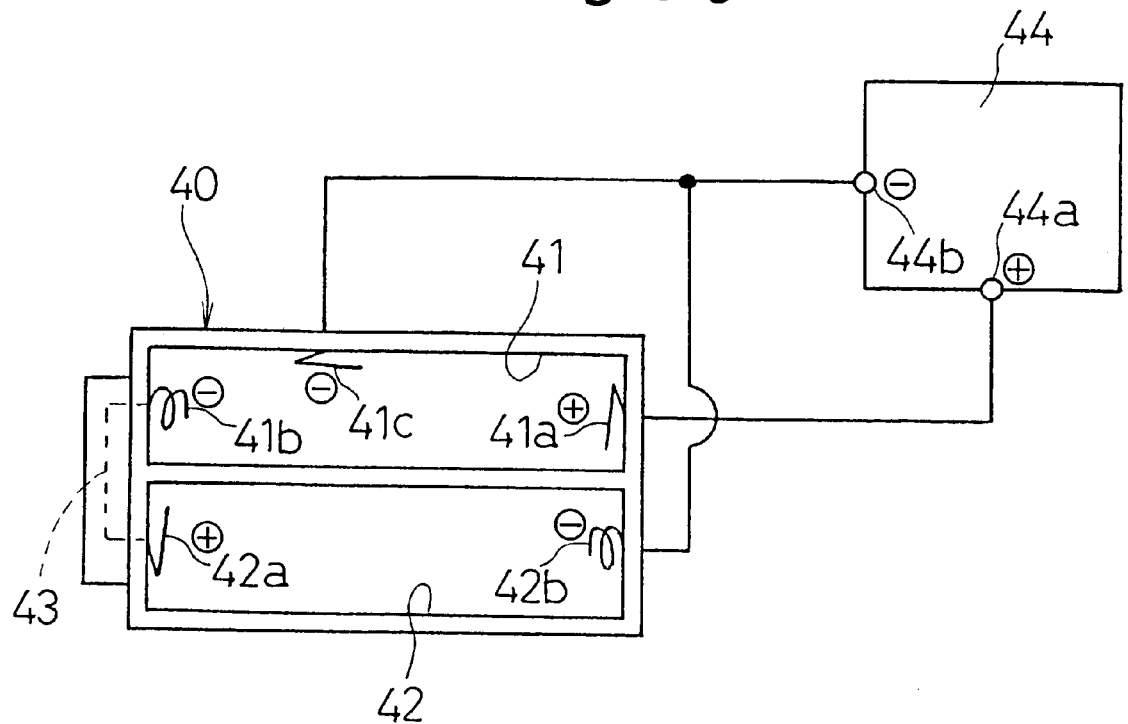
FIG. 5 is a diagram showing the construction of a battery holder in which both of the above cell and an aqueous electrolyte low potential cell can be used.
Figure 6:
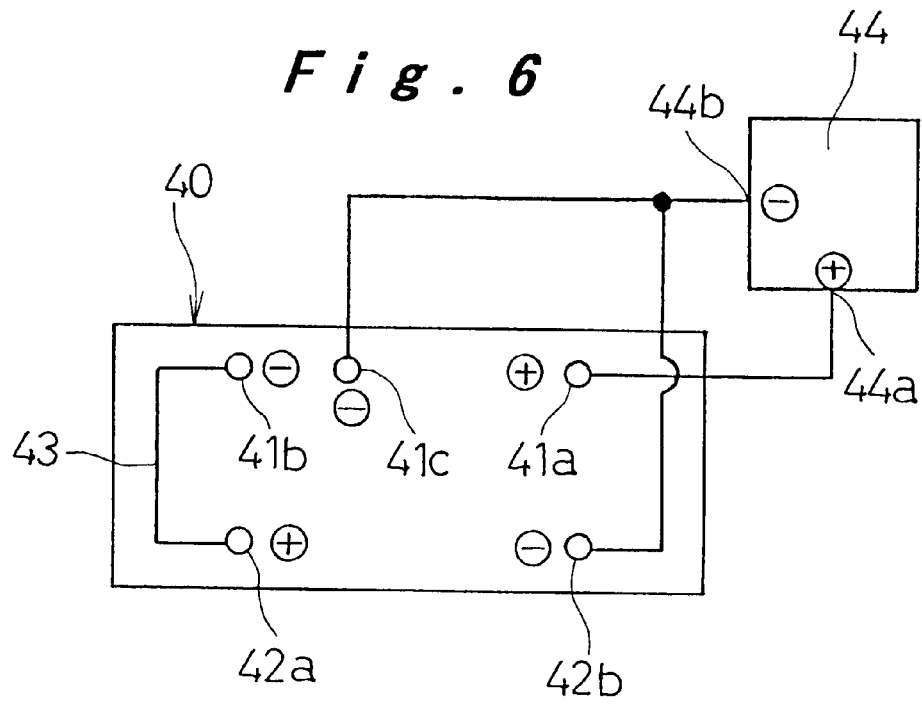
FIG. 6 is an electrically equivalent circuit diagram of the above battery holder.

FIG. 5 is a diagram showing the battery holder 40 which enables the high potential cell Ba2 of the above embodiment to be used interchangeably with the low potential cell Ba1 while preventing various kinds of trouble, and FIG. 6 is an electrically equivalent circuit diagram of this battery holder. The battery holder 40 has a common cavity 41 and a low potential cell cavity 42 in parallel arrangement as shown in FIG. 5 for accommodating either one of a high potential cell Ba2 that generates power of 3 volts and has similar construction to that of the cylindrical lithium battery shown in FIGS. 1A, 1B, and a low potential cell Ba1 that generates power of 1.5 volts such as an existing aqueous electrolyte cylindrical cell.

Positive contacts 41a, 42a consisting of a leaf spring or the like and negative contacts 41b, 42b consisting of a coil spring or the like are respectively provided inside of the cavities 41, 42 at both ends such that the positive side and the negative side are arranged reversely in the adjacent cavities. The negative contact 41b of the common cavity 41 and the positive contact 42a of the low potential cell cavity 42 are electrically connected to each other via a connector 43. In addition, a side negative contact 41c is provided on the inner wall of the common cavity 41, located away from the center between the positive and negative contacts 41a, 41b to the side of the negative contact 41b correspondingly to the negative terminal 23 of the high potential cell Ba2 shown in FIG. 1A.

Figures 12C, 12D:
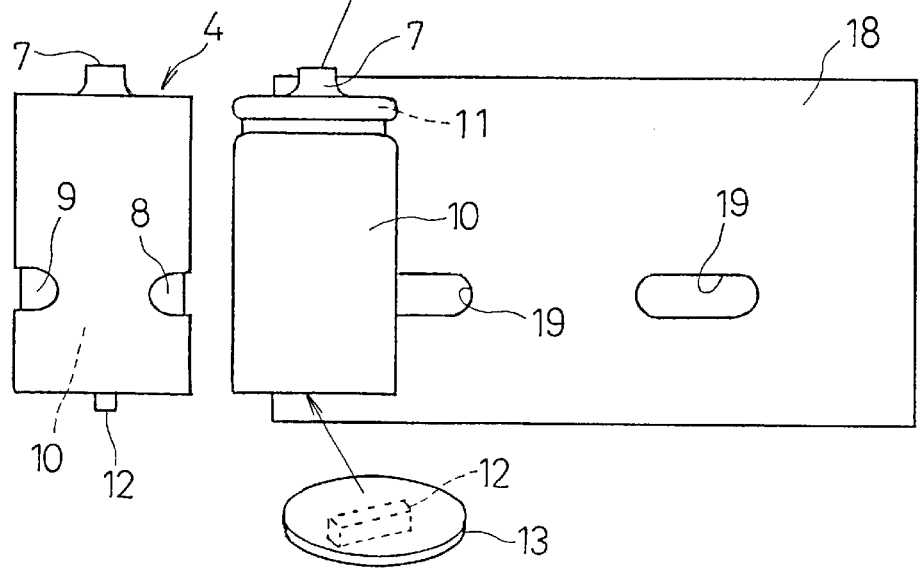
FIG. 12C is a plan view.
FIG. 12D is a bottom view, all showing a conventional secondary battery provided with a side terminal.

The positive contact 41a of the common cavity 41 is connected to a load terminal 44a on the positive side of a load 44 of an electric device, and the side negative contact 41c of the common cavity 41 and the negative contact 42b of the low potential cell cavity 42 are connected in common to a load terminal 44b on the negative side of the load 44. In short, the difference between this battery holder 40 and an existing battery holder for accommodating two low potential cells Ba1 in the cavities 41, 42 in parallel arrangement for series connection lies only in that the side negative contact 41c is added. A battery holder for the conventional secondary battery 4 shown in FIG. 12 would need a slot for receiving the projection 12, and therefore, it would be difficult to use the cavities completely in common with different types of battery such as primary cells of the same size. However, it should be noted that the battery holder 40 of the present invention can also be used with any of existing cylindrical batteries including the one shown in FIG. 12A as long as the battery to be used has its negative terminal on one end of the cell casing or on a side at a location corresponding to the side negative contact in the battery holder.

Cells Ba1, Ba2 can be inserted in the battery holder 40 as will be described below with reference to FIGS. 7A, 7B and FIGS. 8A–8D. In this embodiment, the battery holder 40 is incorporated in a battery compartment of an electric device of which rated voltage is 3V, for accommodating the high potential cell Ba2 or the cylindrical lithium primary cell shown in FIG. 1A and the low potential cell Ba1 or the existing aqueous electrolyte battery.

Figure 7A:
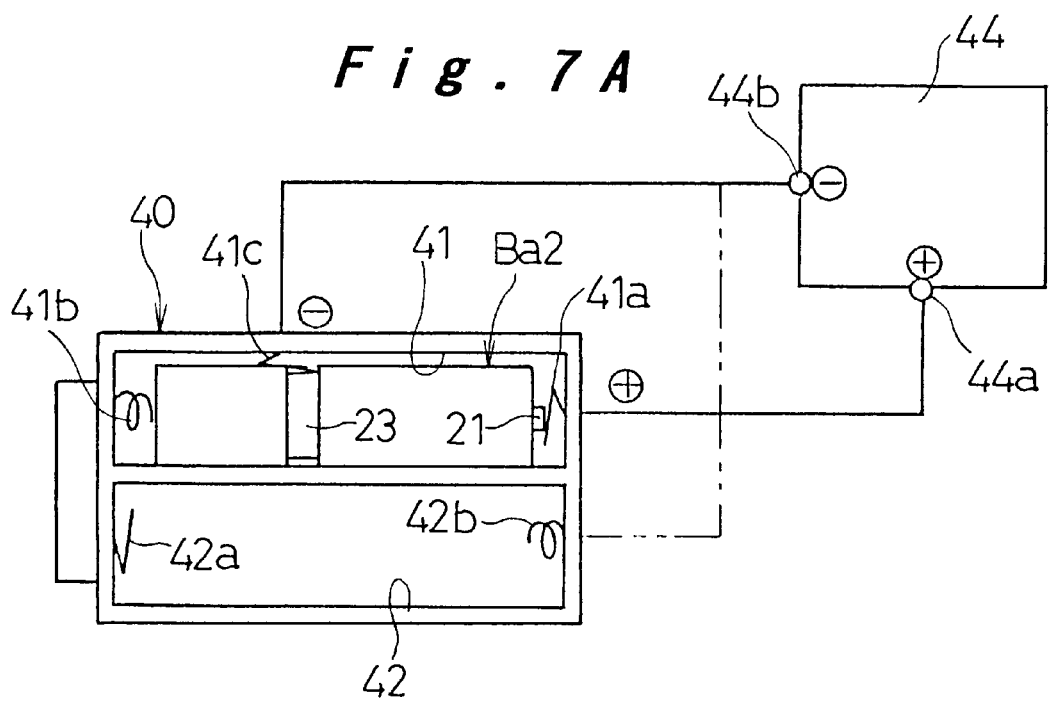
FIG. 7A is a diagram showing a state in which the above cell is used in the above battery holder.

When using the high potential cell Ba2, it is inserted into the common cavity 41 so that the positive terminal 21 contacts the positive contact 41a as shown in FIG. 7A. The positive terminal 21 is thereby electrically connected to the positive contact 41a, while the negative terminal 23 is electrically connected to the side negative contact 41c, whereby the positive and negative terminals 21, 23 of the high potential cell Ba2 are connected respectively to the positive load terminal 44a and negative load terminal 44b of the load 44 via the positive and negative contacts 41a, 41c, and the high potential cell Ba2 outputs power of 3V to the load 44.

Figure 7B:
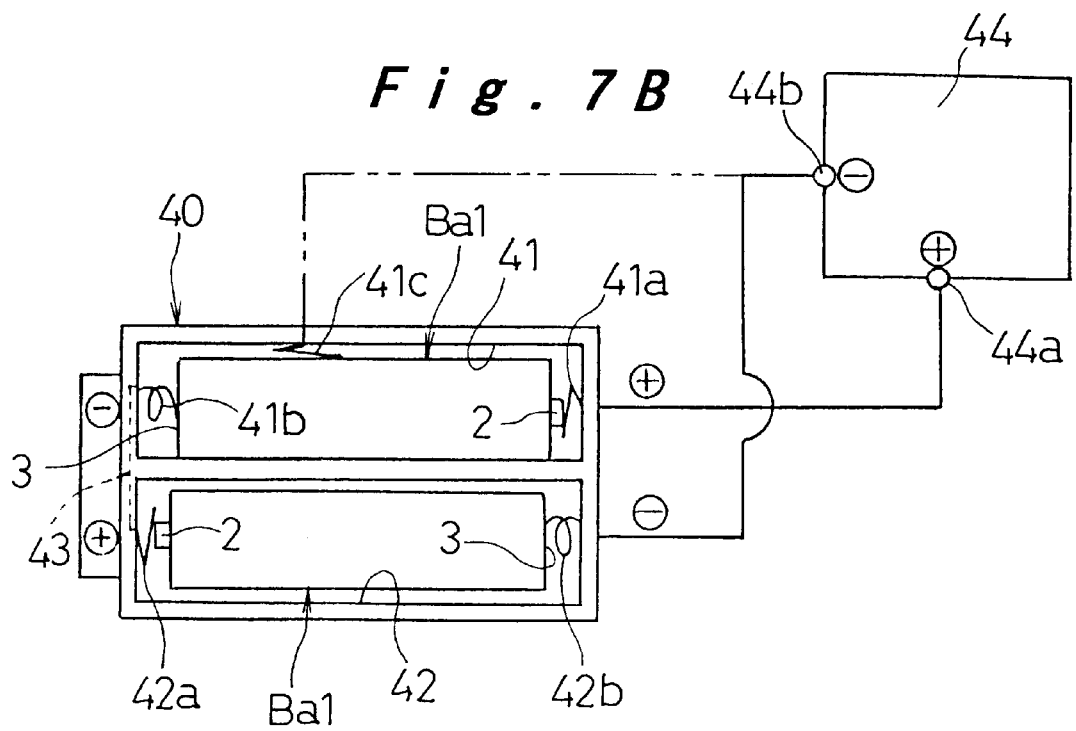
FIG. 7B is a diagram showing a state in which a low potential cell is used in the above battery holder.

On the other hand, if two low potential cells Ba1 are to be used in series connection, each of the cells is inserted respectively into the cavities 41, 42 so that their respective positive and negative terminals 2, 3 contact the positive and negative contacts 41a, 42a, 41b, 42b as shown in FIG. 7B. The negative terminal 3 of the cell in the common cavity 41 and the positive terminal 2 of the cell in the low potential cell cavity 42 are thereby connected to each other through the connector 43 of the battery holder 40, as a result of which the two low potential cells Ba1, Ba1 are connected in series between the positive load terminal 44a and negative load terminal 44b of the load 44. The load 44 is thus supplied with power of 3V which is the sum of the output voltage of the two series-connected low potential cells Ba1, Ba1.

Figure 8A:
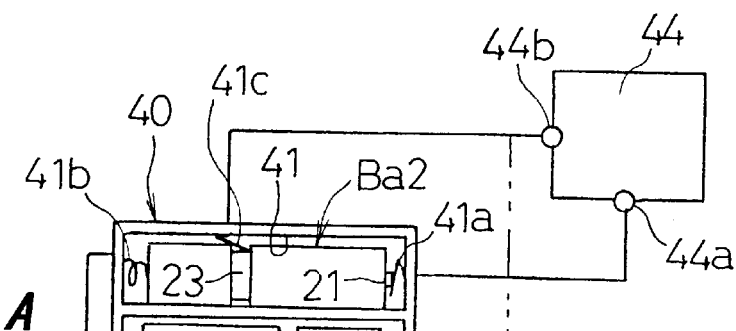
FIGS. 8A–8D are diagrams each showing a case in which a cell or cells are wrongly inserted in the above battery holder.

Next, description will be made with respect to the cases in which the low potential cell Ba1 and the high potential cell Ba2 are wrongly inserted in the battery holder 40. If two high potential cells Ba2, Ba2 are respectively inserted in the cavities 41, 42 such that their respective positive terminals 21, 21 are oriented to contact the respective positive contacts 41a, 42a of the cavities 41, 42 as shown in FIG. 8A, both terminals 21, 23 of the high potential cell Ba2 in the common cavity 41 are properly connected to the positive and negative load terminals 44a, 44b as indicated in solid lines similarly to the case shown in FIG. 7A.

On the other hand, while the positive terminal 21 of the high potential cell Ba2 in the low potential cell cavity 42 contacts and is electrically connected to the positive contact 42a, the cell in the low potential cavity 42 is not connected to the negative contact 41b of the common cavity 41 since the high potential cell Ba2 in the common cavity 41 has no terminal on the opposite end from the positive terminal. Therefore, the cell Ba2 in the low potential cell cavity 42 is not connected to the cell Ba2 in the common cavity 41 and is merely housed in the cavity 42, not contributing to power supply to the load 44. As a result, the load 44 is properly supplied with 3V output voltage from the high potential cell Ba2 in the common cavity 41 just as the case shown in FIG. 7A.

Figure 8B:
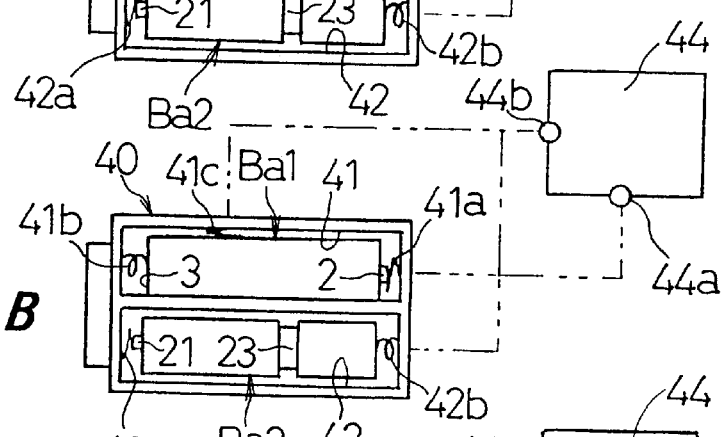
Figure 8C:
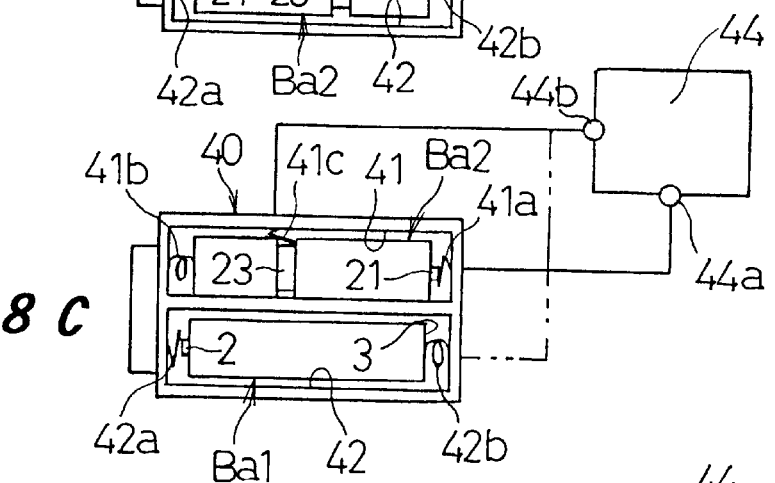

Next, if the low potential cell Ba1 is inserted in the common cavity 41 and the high potential cell Ba2 is inserted in the low potential cell cavity 42 respectively by mistake as shown in FIG. 8B, the high potential cell Ba2 is merely accommodated in the low potential cell cavity 42 since it is not connected to the negative contact 42b, and therefore, does not contribute to power supply to the load 44. On the other hand, the low potential cell Ba1 in the common cavity 41, while it is connected to the positive terminal 21 of the high potential cell Ba2, it is not connected to the side negative contact 41c. Accordingly, the low potential cell Ba1 is merely accommodated in the cavity 41, and does not contribute to the power supply to the load 44 either. Therefore, in this case neither of the cells Ba1, Ba2 are connected to the load 44, but there is no particular inconvenience other than that the load 44 is not energized.

Next, if the high potential cell Ba2 is inserted in the common cavity 41, and the low potential cell Ba1 is inserted in the low potential cavity 42 as well, both being properly oriented, the battery terminals 21, 23 of the high potential cell Ba2 in the common cavity 41 are respectively connected to the positive and the negative load terminals 44a, 44b as indicated in solid lines, similarly to the case shown in FIG. 7A. On the other hand, while the positive and the negative terminals 2, 3 of the low potential cell Ba1 in the low potential cell cavity 42 are electrically connected to the positive and the negative contacts 42a, 42b, respectively, the high potential cell Ba2 is not connected to the negative contact 41b of the common cavity 41. Thus the low potential cell Ba1 is not connected to the high potential cell Ba2 but is merely accommodated in the cavity 42, and does not contribute to the power supply to the load 44. As a result, the connection is made similarly to the cases shown in FIG. 7A and FIG. 8A, whereby the load 44 is supplied with a voltage of 3 volts outputted from the high potential cell Ba2 in the common cavity 41.

Figure 8D:
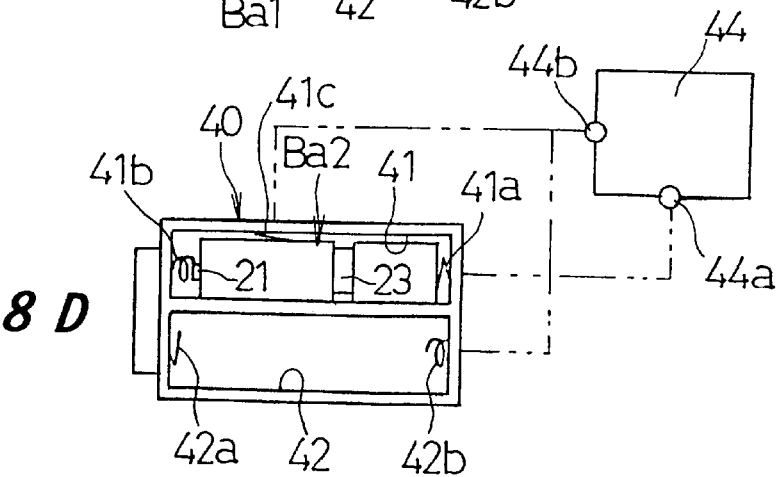

If the high potential cell Ba2 is inserted reversely in the common cavity 41 as shown in FIG. 8D, the negative terminal 23 does not contact the side negative contact 41c, since the negative terminal 23 is situated off of the longitudinal center away from the positive terminal 21. The cell Ba2 does not contribute to the power supply to the load 44 nor does it cause any inconvenience.

As can be seen from the above, even if two high potential cells Ba2, Ba2 are inserted by mistake, the load 44 will be supplied with the normal voltage of 3 volts and not 6 volts. Even if the high potential cell Ba2 and the low potential cell Ba1, a different type of battery, are inserted together mistakenly, the power supply circuit will either be opened, or closed so that the 3V voltage is properly supplied to the load 44, and there will be no trouble. Also, even if the high potential cell Ba2 is reversely inserted in the common cavity 41 by mistake, it will not be connected to the load 44.

Figure 9A:
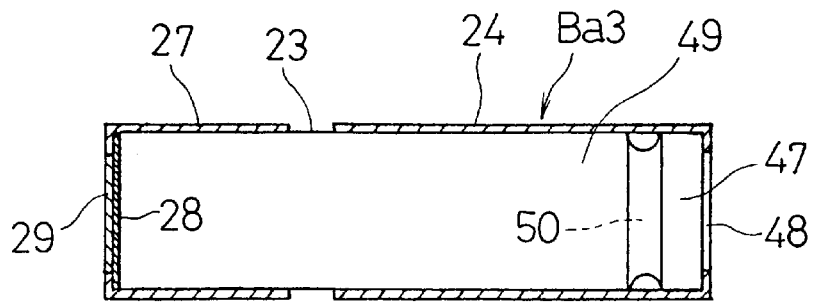
FIG. 9A is a side view partly in cross section of a cell according to a second embodiment of the present invention.
Figure 9B:
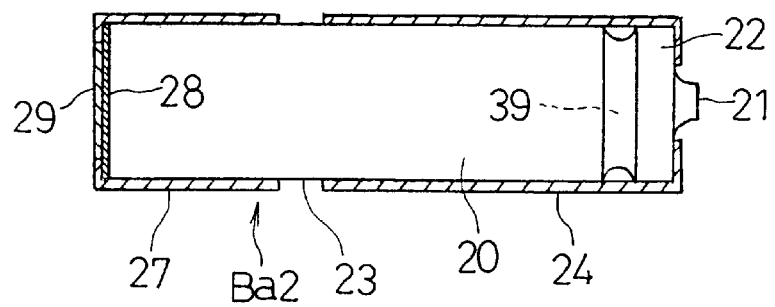
FIG. 9B is a side view partly in cross section of the cell according to the first embodiment shown for the purpose of comparison.

FIG. 9A is a side view partly in cross section of a high potential cell Ba3 according to a second embodiment of the present invention, and FIG. 9B is a side view partly in cross section of the high potential cell Ba2 of the first embodiment shown for the purpose of comparison. In FIG. 9A, same or similar elements are given the same reference numerals as those in FIG. 9B. The end face of this high potential cell Ba3 on the side of a sealing assembly 47 having a positive terminal 48 is formed flat with no protrusion. A sealing assembly support 50 inwardly formed in the cell casing 49 for supporting the sealing assembly 47 is situated closer to the positive terminal 48 as compared to the sealing assembly support 39 of the cell Ba2 in FIG. 9B.

In other words, the length of the cell casing 49 is increased toward the positive terminal 48 side by the length of the projection 21 in the cell Ba2, and the battery volume is accordingly increased. Therefore, the cell Ba3 of this embodiment has the advantage that battery capacity can be enhanced by increasing the plate area of the electrode assembly in accordance with the larger cell casing 49, in addition to the effects similar to the high potential cell Ba2 of the first embodiment when used in similar conditions.

Figure 10A:
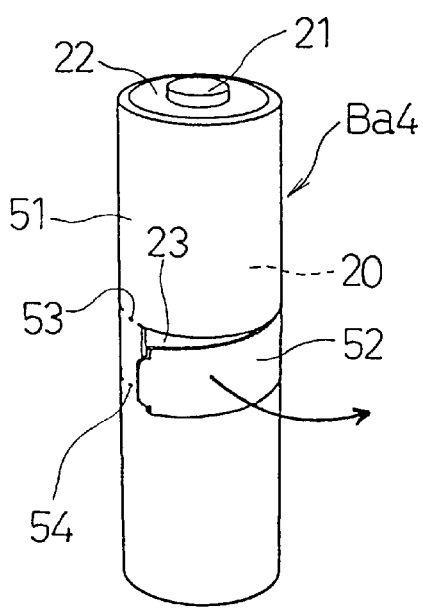
FIG. 10A and FIG. 10B are perspective views showing a cell according to a third embodiment of the present invention before and during use.
Figure 10B:
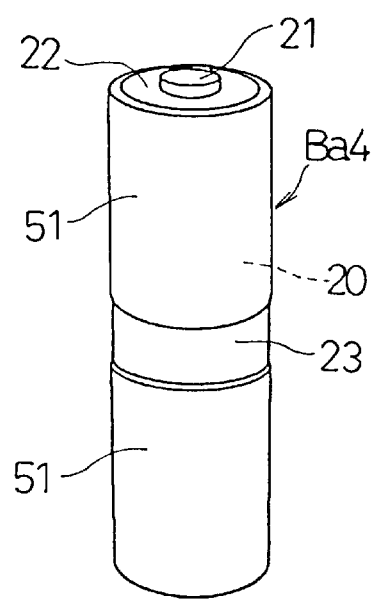

FIG. 10A and FIG. 10B are perspective views showing a high potential cell Ba4 according to a third embodiment of the present invention, which is a cylindrical lithium primary cell, before and when it is used. The high potential cell Ba4 of this embodiment differs from the high potential cell Ba2 of the first embodiment in that, before the cell Ba4 is used, as shown in FIG. 10A, the entire exterior surface of the cylindrical cell casing 20 including the electrode terminal 23 is covered with a strip of heat-shrinkable nonconductive label 51. A portion of the heat-shrinkable nonconductive label 51 providing a virgin seal 52 at a position corresponding to the negative terminal 23 is removed when the cell Ba4 is to be used.

The heat-shrinkable nonconductive label 51 contains a shrink film made of polyvinylchloride or polyethylene terephthalate and printed on its exterior surface with an UV ink design and text and further coated thereon with an UV varnish. The inside surface or the bonding surface of the shrink film has been subjected to aluminum vapor deposition, after which an adhesive, for example, an acrylic adhesive has been applied thereon. However, the adhesive is not applied on the inner surface of the shrink film at the portion which will function as the virgin seal 52 of the heat-shrinkable nonconductive label 51. Furthermore, perforations 53, 54 are provided along extremely shallow slits formed on one side of the shrink film along the entire circumference on both sides of the portion that forms the virgin seal 52.

Accordingly, when the cell Ba4 is to be used, the virgin seal 52 can be easily torn off along the perforations 53, 54 as shown by an arrow in FIG. 10A so that the negative terminal 23 is exposed. The perforations 53, 54 permit the smooth removal of the virgin seal 52 only and the portion of the heat-shrinkable nonconductive label 51 in the vicinity of the negative terminal 23 is not peeled off. After the virgin seal 52 has been removed, the cell Ba4 appears the same as the high potential cell Ba2 of the first embodiment, and the same effects can be achieved in the application described in the foregoing.

With the negative terminal 23 covered with the virgin seal 52, the high potential cell Ba4 of this embodiment has advantages in that self-discharge is low, storability is excellent, and product maintenance is easy. Moreover, a non-used cell Ba4 is clearly distinguishable owing to the existence of the virgin seal 52.

Generally, battery users carry a new battery in a pocket or a bag so that they can replace the batteries immediately when the electric device has exhausted the power supply. In case a string of metallic object such as a necklace is carried with the battery, both terminals 21, 23 may well be short-circuited by such metallic object, especially because the high potential cell according to the present invention has the terminals 21, 23 situated closer to each other. Since the high potential cell of this invention is intended for use as a cylindrical lithium primary cell having a high output voltage of 3V, such short circuit must be prevented. The high potential cell Ba4 of the third embodiment solves this problem and eliminates the risk of short circuit between the terminals 21, 23 with a metal string before use when it is most likely to be carried around owing to the virgin seal 52 covering the negative terminal 23.

Furthermore, the heat-shrinkable nonconductive label 51 is a single sheet in this embodiment and thus can be wound around and bonded to the cylindrical exterior surface of the cell casing 20 readily with the similar method used for the manufacture of other dry cell batteries. The bonding step of the heat-shrinkable nonconductive label 51 can be further simplified as compared to the first embodiment wherein two heat-shrinkable nonconductive labels 24, 27 are positioned before being bonded to the cell casing.

While the description has been made above with the example of a cylindrical lithium primary cell of 3V output voltage having the same outer dimensions as those of other generally used cylindrical aqueous electrolyte cells such as dry cell batteries and nickel-cadmium batteries, it should be noted that the present invention is not limited to the 3-Volt cylindrical lithium primary cell and may be applied to prismatic or thin, flat (chewing gum-like) configuration. Output voltage of the cell should, of course, not be limited to 3 volts.

INDUSTRIAL APPLICABILITY

As described above, the present invention provides a high potential cell having a negative terminal in a recessed, ring-like form on the exterior surface of the cell casing. The present invention cell can be mass-produced at a high speed since such negative terminal can be provided by merely bonding two nonconductive labels on the cell casing. Thus the present invention is highly practicable. Moreover, such cell can be clearly distinguished from different types of batteries with both terminals on both ends, while it can be used in a battery holder in common with different types of batteries without causing any trouble. A lithium battery having advantages such as light weight, high voltage, high energy density, and long life can be thereby applied for various electric devices not only for specific but for general purposes.

What is claimed is:

1. A battery comprising:
    a first terminal provided at one end of a battery casing; and
    a second terminal on an exterior surface of the battery casing, wherein:
    the second terminal is an entire circular circumferential surface of a predetermined width of the battery casing, and that another end of the battery casing opposite the first terminal electrically insulated by affixing an electrically nonconductive film thereto;
    two heat-shrinkable nonconductive labels are wound around and bonded on the exterior surface of the battery casing at a predetermined spacing corresponding to the width of the second terminal; and
    the entire exterior surface of the battery casing except a portion of the second terminal is electrically insulated by the heat-shrinkable nonconductive labels, and that the second terminal is formed in a recessed, ring-like form between the two heat-shrinkable nonconductive labels.

2. The battery according to claim 1 wherein the heat-shrinkable nonconductive label is coated with a heat-sensitive adhesive on an inner side thereof, which exhibits adhesion when heated, and the heat-shrinkable nonconductive label is bonded to the battery casing by applying heat.

3. The battery according to claim 1 wherein the second terminal is located away from a center in a longitudinal direction of the battery casing toward one side at a distance from one end of the battery casing.

4. The battery according to claim 1 wherein the end of the battery casing opposite the first terminal is coated with an electrically nonconductive material, and is covered with a plurality of electrically nonconductive films superposed upon one another on said electrically nonconductive coating.

5. The battery according to claim 1 wherein the end of the battery casing opposite the first terminal is covered with a first nonconductive film of a size smaller than the end surface of the battery casing, and a second nonconductive film of a size smaller than the first nonconductive film bonded upon the first nonconductive film, said first and second nonconductive films being bonded to the end surface of the battery casing with a heat-sensitive adhesive that exhibits adhesion when heated.

6. The battery according to claim 1 wherein the heat-shrinkable nonconductive label has a width such that when it is wound around the exterior surface of the battery casing, one edge thereof extends a predetermined length from the ends of a battery casing, said edge of the heat-shrinkable nonconductive label being shrunk into close contact with the periphery of the ends of the battery casing.

7. The battery according to claim 1 wherein the heat-shrinkable nonconductive label and the electrically nonconductive film are both opaquely colored, while the first and second terminals have a metallic shine of nickel-plating.

8. The battery according to claim 1 wherein both of the end surfaces of the battery casing are formed flat.

9. The battery according to claim 1 which is configured in cylindrical form of the same outer dimensions as those of a cylindrical aqueous electrolyte battery, and is constructed with lithium for a negative electrode, and which battery has an output voltage higher than that of the aqueous electrolyte battery.

10. A battery comprising a first terminal provided at one end of a battery casing, and a second terminal on an exterior surface of the battery casing, wherein:
    the second terminal is an entire circular circumferential surface of a predetermined width of the battery casing, and that the other end of the battery casing opposite the first terminal is electrically insulated by affixing an electrically nonconductive film thereto;
    a sheet of heat-shrinkable nonconductive label having a separable portion at a position corresponding to the second terminal is wound around and bonded to the exterior surface of the battery casing so that the entire exterior surface of the battery casing is electrically insulated by the heat-shrinkable nonconductive label, the second terminal being covered with the separable portion of the heat-shrinkable nonconductive label before use; and
    the separable portion of the heat-shrinkable nonconductive label is removed for revealing the second terminal when the battery is to be used.

11. The battery according to claim 10 wherein the separable portion of the heat-shrinkable nonconductive label comprises rows of perforations formed along slits on both sides thereof.

12. The battery according to claim 10 wherein the heat-shrinkable nonconductive label is coated with a heat-sensitive adhesive on an inner surface thereof except the separable portion.

* * * * *